(12) United States Patent
Shigetoshi

(10) Patent No.: US 7,580,203 B2
(45) Date of Patent: Aug. 25, 2009

(54) LENS ASSEMBLY HAVING MOVABLE LENS

(75) Inventor: Motoo Shigetoshi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 90 days.

(21) Appl. No.: 11/606,057

(22) Filed: Nov. 30, 2006

(65) Prior Publication Data

US 2008/0130135 A1 Jun. 5, 2008

(30) Foreign Application Priority Data

Nov. 30, 2005 (JP) .............................. 2005-346404

(51) Int. Cl.
*G02B 15/14* (2006.01)
*G02B 7/02* (2006.01)
(52) U.S. Cl. ...................... 359/701; 359/694; 359/822; 359/823; 359/830
(58) Field of Classification Search ................ 359/676, 359/694, 701, 811, 822–823, 830
See application file for complete search history.

(56) References Cited

U.S. PATENT DOCUMENTS

2004/0017616 A1* 1/2004 Hirata et al. ................ 359/759

2006/0221465 A1* 10/2006 Noguchi et al. ............. 359/694
2008/0055409 A1* 3/2008 Mars et al. .................. 348/143

FOREIGN PATENT DOCUMENTS

| JP | 5-034605 A | | 2/1993 |
|---|---|---|---|
| JP | 05034605 A | * | 2/1993 |
| JP | 8-167751 A | | 6/1996 |
| JP | 2002-112082 A | | 4/2002 |

* cited by examiner

*Primary Examiner*—Jessica T Stultz
*Assistant Examiner*—Mahidere S Sahle
(74) *Attorney, Agent, or Firm*—Sughrue Mion, PLLC

(57) ABSTRACT

A lens assembly has an image pickup device incorporated therein, and includes a zoom lens for passage of light to the image pickup device. A cam mechanism moves the zoom lens along an optical axis. The cam mechanism includes a rotatable zoom ring for zooming operation by rotating about the optical axis. There are an intake vent for air flow from an outside to an inner space, and an exhaust vent for air flow from the inner space to the outside. Plural fan blades are formed to project from the zoom ring, for propelling the air in the inner space upon the rotation for zooming, to dissipate heat by air flow. The fan blades are inclined relative to a rotational direction of the zoom ring. Furthermore, an air filter is porous and air permeable, secured inside each of the intake vent and the exhaust vent.

17 Claims, 7 Drawing Sheets

LENS ASSEMBLY HAVING MOVABLE LENS

BACKGROUND OF THE INVENTION

1. Field of the Invention

The present invention relates to a lens assembly having a movable lens. More particularly, the present invention relates to a lens assembly having a movable lens in which heat generated harmfully from an electronic device can be eliminated to keep the inside cooled effectively.

2. Description Related to the Prior Art

A digital still camera is widely used, in which an image pickup device such as a CCD image sensor is used to photograph an image to produce image data of a digital form. The image data is written to a storage medium such as a built-in data storage, memory card and the like. Examples of the digital still camera include a lens exchangeable type in which a selected one of plural lens assemblies is set and used for the purpose of photography. A camera main unit is combined with a lens assembly to constitute the digital still camera of a lens exchangeable type. In general, the image pickup device is incorporated in the camera main unit. It is necessary optically to connect lens groups in the lens assembly to the image pickup device of the camera main unit in mounting the lens assembly. This makes it difficult for unskilled users to handle the digital still camera because of necessity of back focus adjustment and other conditions.

Types of the digital still camera in which the image pickup device is incorporated in the lens assembly are known with the purpose facilitating handling of the digital still camera of the lens exchangeable type. There is no need of optical connection of the lens assembly. Electric connection of the lens assembly with the camera main unit is easy for users to handle. There is a further advantage in the image pickup device built-in type of the lens assembly in that a chamber for the image pickup device can be tightly closed, to protect the inside with the image pickup device from entry of dust, dirt or other foreign material. However, the image pickup device built-in type of the lens assembly has a shortcoming in smaller efficiency in cooling because of a small space in the lens assembly for containing the image pickup device and circuits for driving the image pickup device. Performance of various circuits may be lower due to the smaller efficiency of cooling.

Various techniques have been suggested for cooling parts generating heat in an apparatus. JP-A 8-167751 discloses a laser apparatus in which a solid state laser device is excited by use of semiconductor laser light. Heat dissipating fins are secured to the apparatus. JP-A 2002-112082 discloses the digital still camera in which the lens assembly protrudes. Parts which will generate heat are disposed on a lateral side of the lens assembly. Heat dissipating fins are secured to those parts. JP-A 5-034605 discloses the digital still camera removably connected with an endoscope. A fan mechanism is disposed on a rear of the image pickup device which will generate heat.

However, JP-A 8-167751 and 2002-112082 disclose only the use of the heat dissipating fins, panels or the like. Efficiency of cooling cannot be higher than is intended by the fins, because of lack of further control. JP-A 5-034605 has a shortcoming in that the fan mechanism for cooling requires a sufficient space in the digital camera. The size of the digital camera and the number of the parts for this become greater, to raise the manufacturing cost.

SUMMARY OF THE INVENTION

In view of the foregoing problems, an object of the present invention is to provide a lens assembly having a movable lens in which heat generated harmfully from an electronic device can be eliminated to keep the inside cooled effectively.

In order to achieve the above and other objects and advantages of this invention, a lens assembly having an image pickup device incorporated therein includes a zoom lens for passage of light to said image pickup device. A rotatable mechanism moves said zoom lens along an optical axis. There is an intake vent for flow of air from an outside to an inner space. An exhaust vent is for flow of air from said inner space to said outside. Plural fan blades are formed to project from said rotatable mechanism, for dissipating heat of said image pickup device by air flow of said air from said intake vent to said exhaust vent upon said rotation of said rotatable mechanism.

Furthermore, a first barrel contains the zoom lens and the image pickup device, the first barrel having the intake vent and the exhaust vent, and supporting the rotatable mechanism in a rotatable manner.

The fan blades are inclined relative to a rotational direction of the rotatable mechanism.

Furthermore, an air filter is porous and air permeable, secured inside each of the intake vent and the exhaust vent.

A moving mechanism moves the zoom lens along an optical axis. The rotatable mechanism has a rotatable sleeve for partially constituting the moving mechanism.

The rotatable sleeve is ring shaped and disposed about the inner space, and the fan blades are formed to project from an inner surface of the rotatable sleeve.

Furthermore, a second barrel contains the zoom lens mounted therein, having a rear panel with a front surface where the image pickup device is secured. The moving mechanism includes a cam barrel disposed about the second barrel, for moving the zoom lens along the optical axis when rotated. The rotatable sleeve is an externally operable zoom ring secured to the cam barrel for rotation thereof.

The moving mechanism further includes a cam surface and a cam pin, a selected one of which, when rotated about the optical axis, presses and shifts a remaining one thereof, to move the zoom lens along the optical axis. The cam barrel has one of the cam surface and the cam pin.

In one preferred embodiment, the rotatable sleeve is contained in the first barrel, and the fan blades are formed to project from an outer surface of the rotatable sleeve.

The moving mechanism includes a cam surface and a cam pin, a selected one of which, when rotated about the optical axis, presses and shifts a remaining one thereof, to move the zoom lens along the optical axis. The rotatable sleeve is a cam barrel having one of the cam surface and the cam pin.

Furthermore, a second barrel is disposed in the cam barrel, for containing the zoom lens mounted therein, having a rear panel with a front surface where the image pickup device is secured.

Furthermore, a heat dissipating fin is disposed in the inner space, to project from a rear surface of the image pickup device.

The intake vent and the exhaust vent are positioned opposite to one another with reference to the optical axis.

Also, a lens assembly having an image pickup device incorporated therein includes a zoom lens for passage of light to the image pickup device. A moving mechanism moves the zoom lens along an optical axis. A first barrel is in a cylindrical shape with a rear panel. A second barrel is in a cylindrical shape with a rear panel, disposed in the first barrel, for containing the zoom lens, the rear panel having a front surface where the image pickup device is supported. A rotatable sleeve is disposed between the first barrel and the second barrel, for partially constituting the moving mechanism, and for zooming operation by rotating about the optical axis. An inner space is defined between the first barrel, the second barrel and the rotatable sleeve in an air tight manner to include a region behind the image pickup device. Coolant of liquid is stored in the inner space. Plural stirring blades are formed to project from the rotatable sleeve, for propelling the coolant in the inner space upon the rotation for the zooming operation, to dissipate heat by flow of the coolant.

The stirring blades are inclined relative to a rotational direction of the rotatable sleeve.

The moving mechanism includes a cam surface and a cam pin, a selected one of which, when rotated about the optical axis, presses and shifts a remaining one thereof, to move the zoom lens along the optical axis. The rotatable sleeve is a cam barrel having one of the cam surface and the cam pin.

Furthermore, a heat dissipating fin is disposed in the inner space, to project from a rear surface of the image pickup device.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
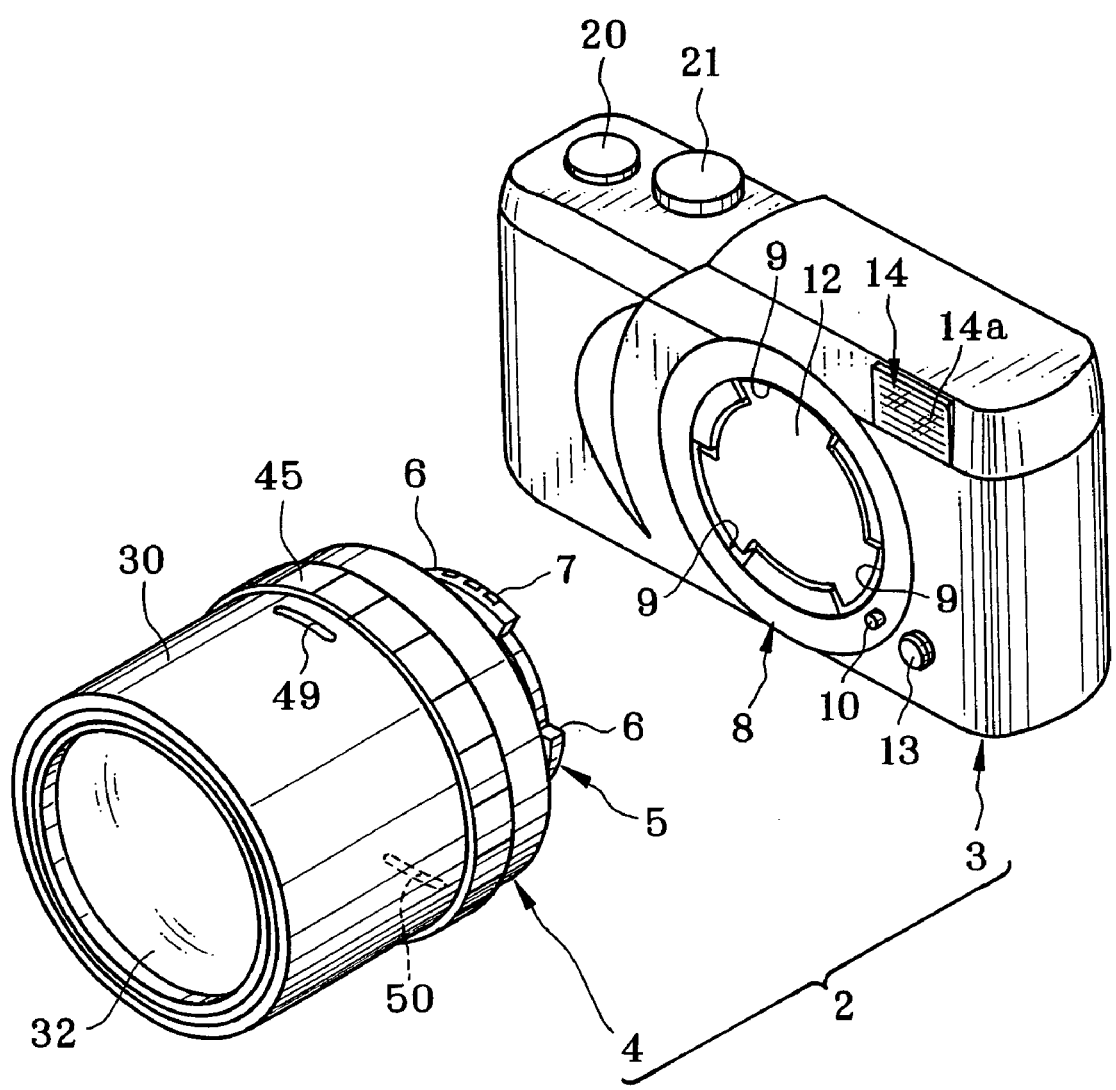
FIG. 1 is a perspective view illustrating a combination of a lens assembly and a camera main unit.

In FIG. 1, a preferred camera system or digital still camera 2 of the invention includes a camera main unit 3 and a lens assembly 4. The lens assembly 4 is fitted on the camera main unit 3 in a removable manner, and connected with the camera main unit 3 electrically upon mechanically fitting thereon.

Figure 5:
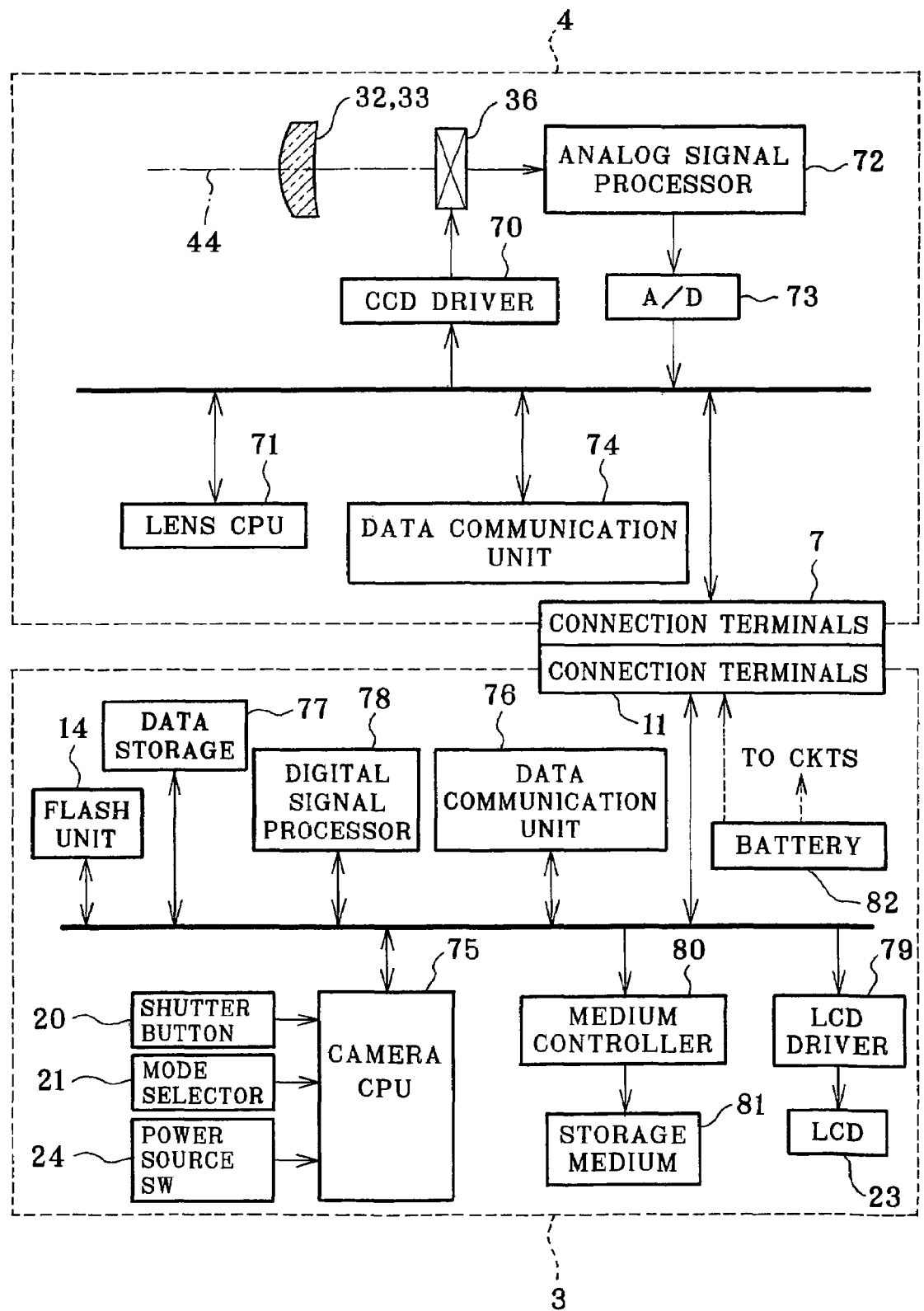
FIG. 5 is a block diagram illustrating circuit arrangement of the digital still camera.

A coupling mechanism 5 is disposed at the rear end of the lens assembly 4. Bayonet lugs 6 are formed in the coupling mechanism 5. Connection terminals 7 are disposed on the bayonet lugs 6. A lens mount mechanism 8 is disposed at the front face of the camera main unit 3. Bayonet channels 9 are formed in the lens mount mechanism 8. To fit the lens assembly 4 on the camera main unit 3, at first the bayonet lugs 6 are set at the bayonet channels 9 and then pushed and rotationally shifted. A lock pin 10 is disposed on the lens mount mechanism 8. When a pinhole (not shown) formed in the coupling mechanism 5 receives and becomes engaged with the lock pin 10, the lens assembly 4 is firmly positioned. In FIG. 5, connection terminals 11 of the lens mount mechanism 8 are connectable with the connection terminals 7 of the coupling mechanism 5 when the lens assembly 4 is positioned suitably. A protection lid 12 is associated with the lens mount mechanism 8, and biased forwards mechanically by a spring. The coupling mechanism 5 depresses the protection lid 12 backwards at the time of mounting the lens assembly 4. When the lens assembly 4 is not mounted, the protection lid 12 prevents entry of dust or other foreign material to the camera main unit 3.

An unlocking button 13 is disposed in the lens mount mechanism 8 and associated with the lock pin 10. To remove the lens assembly 4, the unlocking button 13 is depressed, to shift the lock pin 10 to the rear for unlocking. A flash light source 14a of a flash unit 14 is disposed in a front surface of the camera main unit.

An upper face of the camera main unit 3 has a shutter button 20 and a mode selector 21. The shutter button 20 is depressed for taking an exposure. The mode selector 21 is operable for setting a selected one of an image pickup mode and playback mode. A rear face of the camera main unit 3 has an LCD display panel 23 and a power source switch 24 as depicted in FIG. 5. The LCD 23 displays an image and various information of a setting of the camera.

Figure 2:
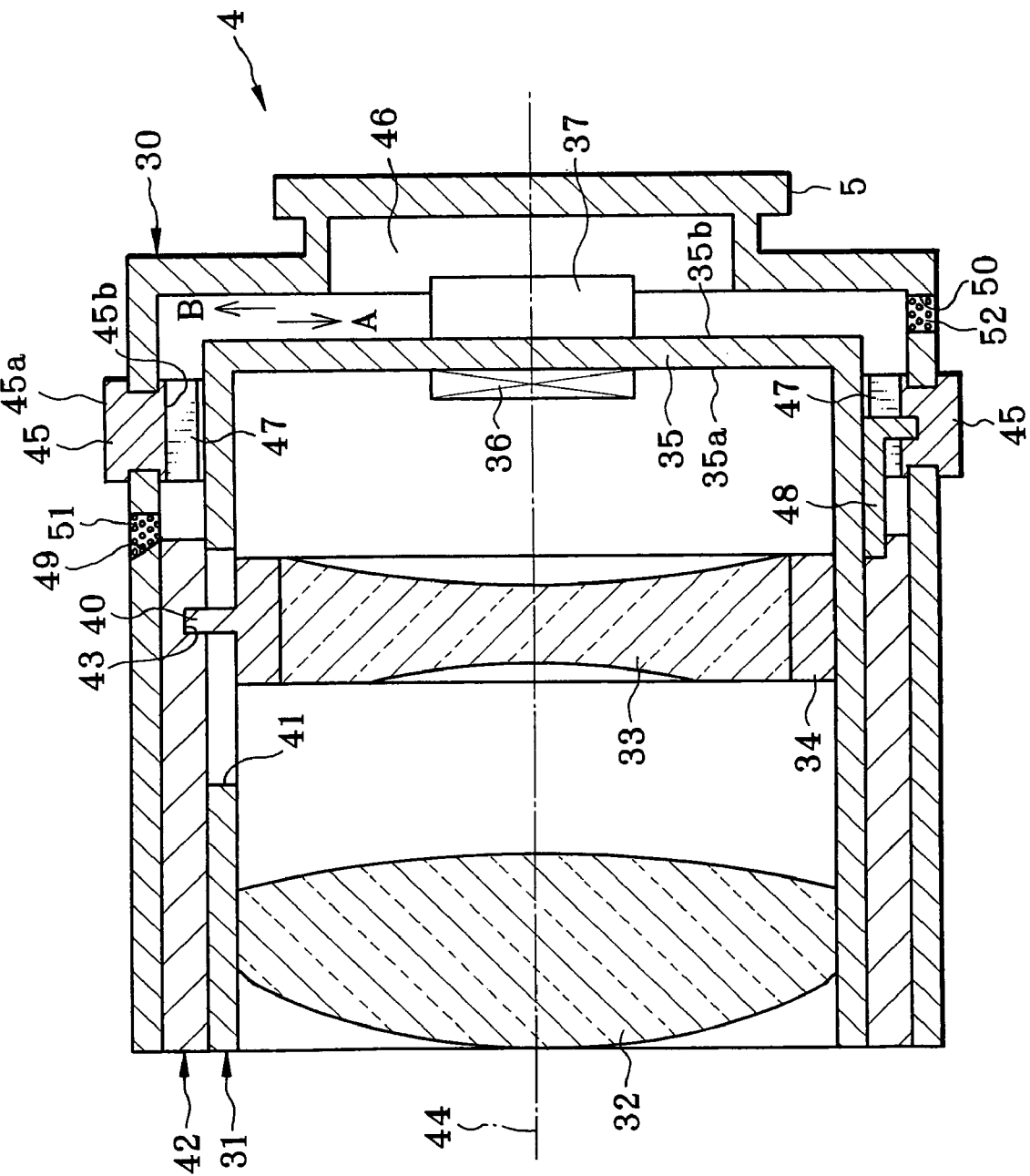
FIG. 2 is a cross section illustrating the lens assembly.

In FIG. 2, a stationary barrel 30 as first barrel is included in the lens assembly 4, and has a rear panel at a closed end to define a bottomed shape. An inner barrel 31 is contained in the stationary barrel 30, and has a rear panel at a closed end.

A first lens/lens group 32 is incorporated in the inner barrel 31. A second lens/lens group 33 as a zoom lens component is disposed behind the first lens/lens group 32. A lens holder 34 of a ring shape holds the second lens/lens group 33 for supporting in the inner barrel 31. A rear panel 35 as base of the inner barrel 31 has a front surface 35a and a rear surface 35b. A CCD image sensor 36 as image pickup device is disposed at the center of the front surface 35a. Heat dissipating fins 37 are disposed on the rear surface 35b and positioned at the CCD 36. In FIG. 2, the heat dissipating fins 37 extend vertically and in parallel with one another. Material of the heat dissipating fins 37 and the rear panel 35 of the inner barrel 31 is preferably a substance having considerable property of heat dissipation, for example aluminum or other metal with high thermal conductivity.

Various elements are mounted on a circuit board on the rear panel 35 of the inner barrel 31 other than the CCD 36, including a CCD driver 70, an analog signal processor 72, an A/D converter 73, a lens CPU 71, and a data communication unit 74. Note that it is possible to provide the camera main unit 3 with a part of various circuits originally in the lens assembly 4, for example, any one of those elements listed in the inner barrel 31. Also, it is possible to provide the lens assembly 4 with a part of various circuits originally in the camera main unit 3, for example, a digital signal processor 78.

Three cam pins 40 as moving mechanism are formed to project from the lens holder 34 in a direction perpendicular to an optical axis 44. The cam pins 40 are three and are arranged regularly at a constant angular pitch on the circumference. Also, linear guide channels 41 are formed in the inner barrel 31, and extend in the optical axis direction. The linear guide channels 41 are three and arranged regularly about the axis. The cam pins 40 are inserted in respectively the linear guide channels 41.

Figure 3:
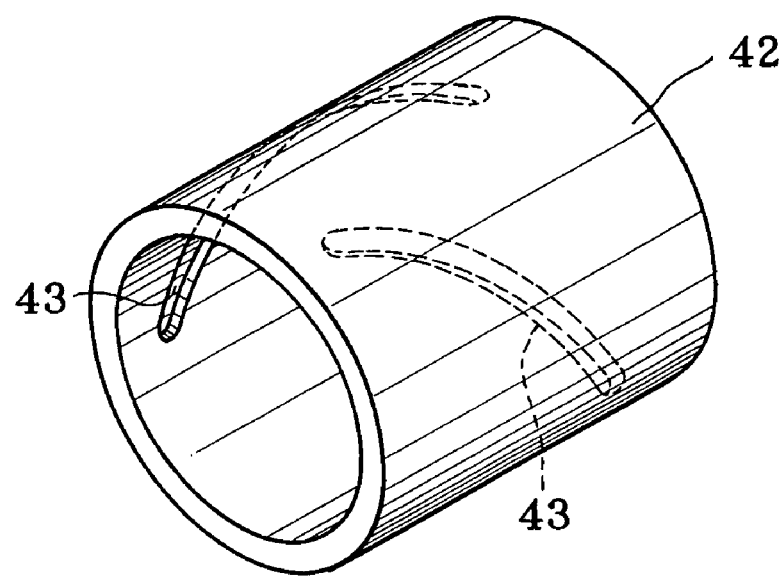
FIG. 3 is a perspective view illustrating a cam barrel.

A cam barrel 42 as rotatable sleeve is disposed between the stationary barrel 30 and the inner barrel 31. An outer surface of the cam barrel, 42 contacts an inner surface of the stationary barrel 30. An inner surface of the cam barrel 42 contacts an outer surface of the inner barrel 31. In FIG. 3, a cam surface of cam grooves 43 as moving mechanism is formed in the cam barrel 42. The number of the cam grooves 43 is three which is arranged at an equal interval in the rotational direction. In FIG. 3, only two of the three are depicted. An end of the cam pins 40 contacts with each of the cam grooves 43. When the cam barrel 42 rotates about the optical axis 44, the cam pins 40 move in engagement with the linear guide channels 41 and the cam grooves 43, to move the second lens/lens group 33 forwards or backwards along the optical axis 44.

Figure 4:
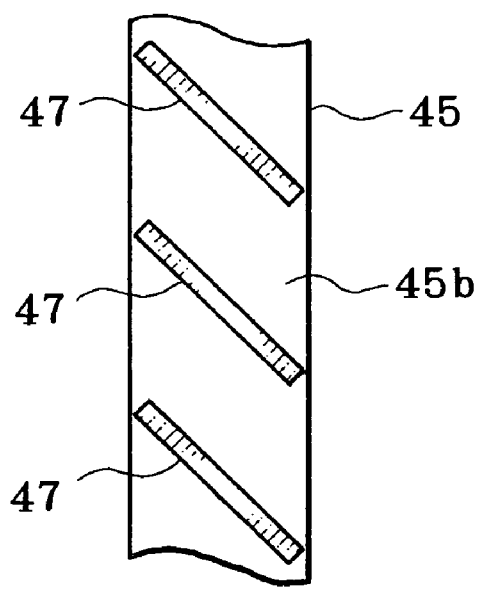
FIG. 4 is an explanatory view illustrating an inner surface of a zoom ring.

A zoom ring 45 as rotatable sleeve is disposed on the stationary barrel 30 and is rotatable about the optical axis 44. A peripheral surface 45a of the zoom ring 45 appears externally about the stationary barrel 30. An inner surface 45b of the zoom ring 45 is disposed in an inner space 46 of the stationary barrel 30. The inner space 46 is defined by the surfaces of the stationary barrel 30, the inner barrel 31 and the cam barrel 42, and includes a region located behind the CCD 36. A first vent 49 for intake of air and a second vent 50 for exhaust of air are formed in the stationary barrel 30. Except for those, the inner space 46 should be kept air tight. In FIG. 4, a plurality of fan blades 47 are formed on the inner surface 45b of the zoom ring 45, and are inclined relative to the rotational direction of the zoom ring 45. The zoom ring 45 is one piece including the fan blades 47.

In FIG. 2, a connection pin 48 connects the cam barrel 42 with the zoom ring 45, to keep the cam barrel 42 rotatable together with the zoom ring 45. A moving mechanism of the second lens/lens group 33 includes the zoom ring 45, the connection pin 48 and the cam barrel 42.

The first and second vents 49 and 50 are positioned in the stationary barrel 30 so that the optical axis 44 is located between those. The first vent 49 is positioned forwards from the zoom ring 45. The second vent 50 is positioned backwards from the zoom ring 45. One of the first and second vents 49 and 50 operates for intake of air, a remaining one of those operating for exhaust of air, according to a selected one of two rotational directions of the zoom ring 45. Air filters or sponges 51 and 52 of air permeable porous material are disposed in the first and second vents 49 and 50 for preventing entry of dust or other foreign material to the lens assembly 4.

In FIG. 5, the CCD 36 is connected with the CCD driver 70. The lens CPU 71 controls the CCD 36 by means of the CCD driver 70. The CCD 36, as an image is focused thereon by the first lens/lens group 32 and the second lens/lens group 33, converts an optical image into an image pickup signal as an output. An image signal from the CCD 36 is sent to the analog signal processor 72. The analog signal processor 72 eliminates electric noise from the image signal by correlated double sampling (CDS), and amplifies the image signal, and then outputs a signal obtained by processing.

The image signal amplified at a suitable level is converted by the A/D converter 73 into image data being a digital signal. The image signal is sent to the camera main unit 3 by the data communication unit 74. A camera CPU 75 is connected with the lens CPU 71, which controls the image pickup, image processing and the like of the lens assembly 4 by communicating with the camera CPU 75.

A data storage 77 stores image data. A data communication unit 76 is connected, and writes image data generated from the lens assembly 4 to the data storage 77. The digital signal processor 78 reads image data from the data storage 77, and subjects the image data to processing of gradation conversion, white balance adjustment, gamma correction, and the like. An LCD driver 79 is provided with the processed image data, to cause the LCD 23 to display a live image.

A storage medium 81, such as a memory card, is accessed when the shutter button 20 is depressed. A medium controller 80 writes image data to the storage medium 81 after image processing of the image signal. When the shutter button 20 is depressed, the flash unit 14 is also driven according to an object light amount of an object to be photographed in a photographic field. The camera CPU 75 communicates with the lens CPU 71, and controls the camera main unit 3 for image pickup, image display, and image writing. Various elements are connected with the camera CPU 75, including the shutter button 20, the mode selector 21 and the power source switch 24.

A battery 82 is contained in the camera main unit 3 for supplying various elements of the camera main unit 3 with power. The battery 82 is also connected with the lens assembly 4 by the connection terminals 7 and 11, to supply various elements of the lens assembly 4 with power.

The operation of the construction is described now. When the lens assembly 4 is mounted on the camera main unit 3, the lens assembly 4 becomes connected with the camera main unit 3 electrically.

The power source switch 24 of the camera main unit 3 is turned on. The mode selector 21 is operated to set a photographing mode for image pickup. The LCD 23 displays a live image. Zooming is possible by manually rotating the zoom ring 45 in observing the live image in the LCD 23. When the shutter button 20 is depressed, an image is photographed. Image data of the image is written to the storage medium 81.

When images are photographed one after another, considerable heat occurs at the CCD 36 and relevant circuits in the lens assembly 4. The heat is conducted by the rear panel 35 of the inner barrel 31 as second barrel and the heat dissipating fins 37 to air of the inner space 46. Thus, the inner space 46 becomes warmer with heat.

The zoom ring 45 is rotated in the clockwise direction as viewed toward the rear in a heated state in air of the inner space 46. The fan blades 47 propel air for air flow in the direction A in FIG. 2. Outer air is caused to flow through the first vent 49 to the inner space 46. Inner air is caused to flow through the second vent 50 to the outside. In contrast, when the zoom ring 45 is rotated in the counterclockwise direction as viewed toward the rear, the fan blades 47 propel air for air flow in the direction B in FIG. 2. Outer air is caused to flow through the second vent 50 to the inner space 46. Inner air is caused to flow through the first vent 49 to the outside. Thus, the heat dissipating fins 37 and the rear panel 35 can be cooled efficiently, to dissipate heat from the CCD 36 and its relevant elements. Performance of the camera can be kept high. It is possible to prevent the lens assembly 4 from having a larger size, and to minimize the manufacturing cost.

Figure 6:
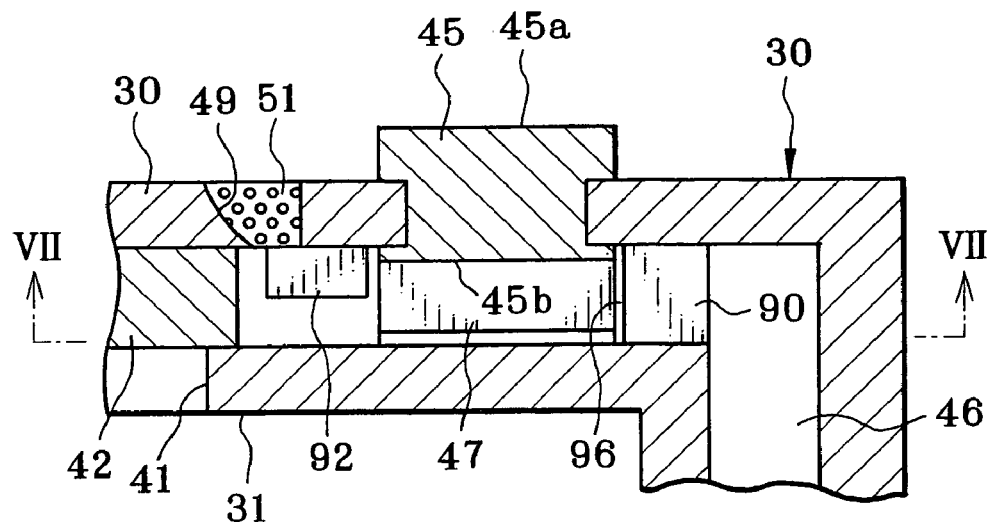
FIG. 6 is a cross section, partially broken illustrating a region with air flow ridges.
Figure 7:
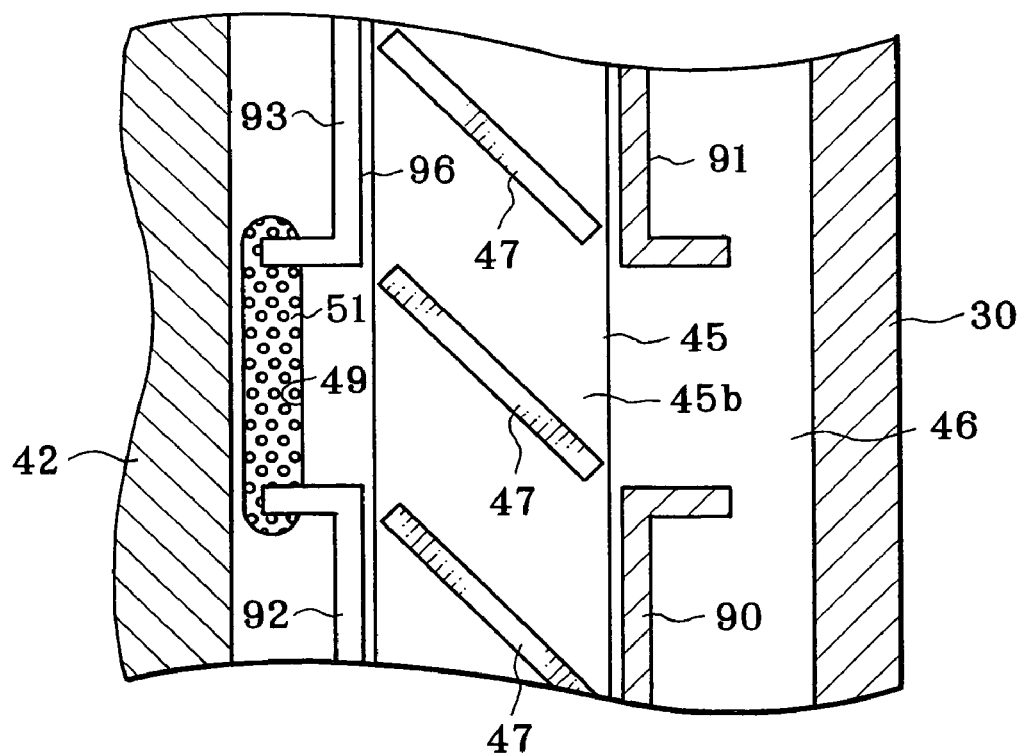
FIG. 7 is a vertical section, partially broken, taken on line VII-VII in FIG. 6.

In addition, it is possible efficiently to cause air to flow into the inner space 46 from the outside of the lens assembly 4. In FIGS. 6 and 7, air flow ridges 90, 91, 92 and 93 for guide are formed in the lens assembly 4. An air path 96 is defined by those. The air flow ridges 90 and 91 are formed in an L shape as viewed in section, and are secured to both of the inner surface of the stationary barrel 30 and the outer surface of the inner barrel 31. The air flow ridges 92 and 93 are formed in an L shape as viewed in section, and are secured only to the inner surface of the stationary barrel 30. A space in the inner barrel 31 at the air flow ridges 92 and 93 is a passageway of the connection pin 48.

Another preferred embodiment is described, in which fan blades are formed to project from a cam barrel. Elements similar to those of the above embodiment are designated with identical reference numerals.

Figure 8:
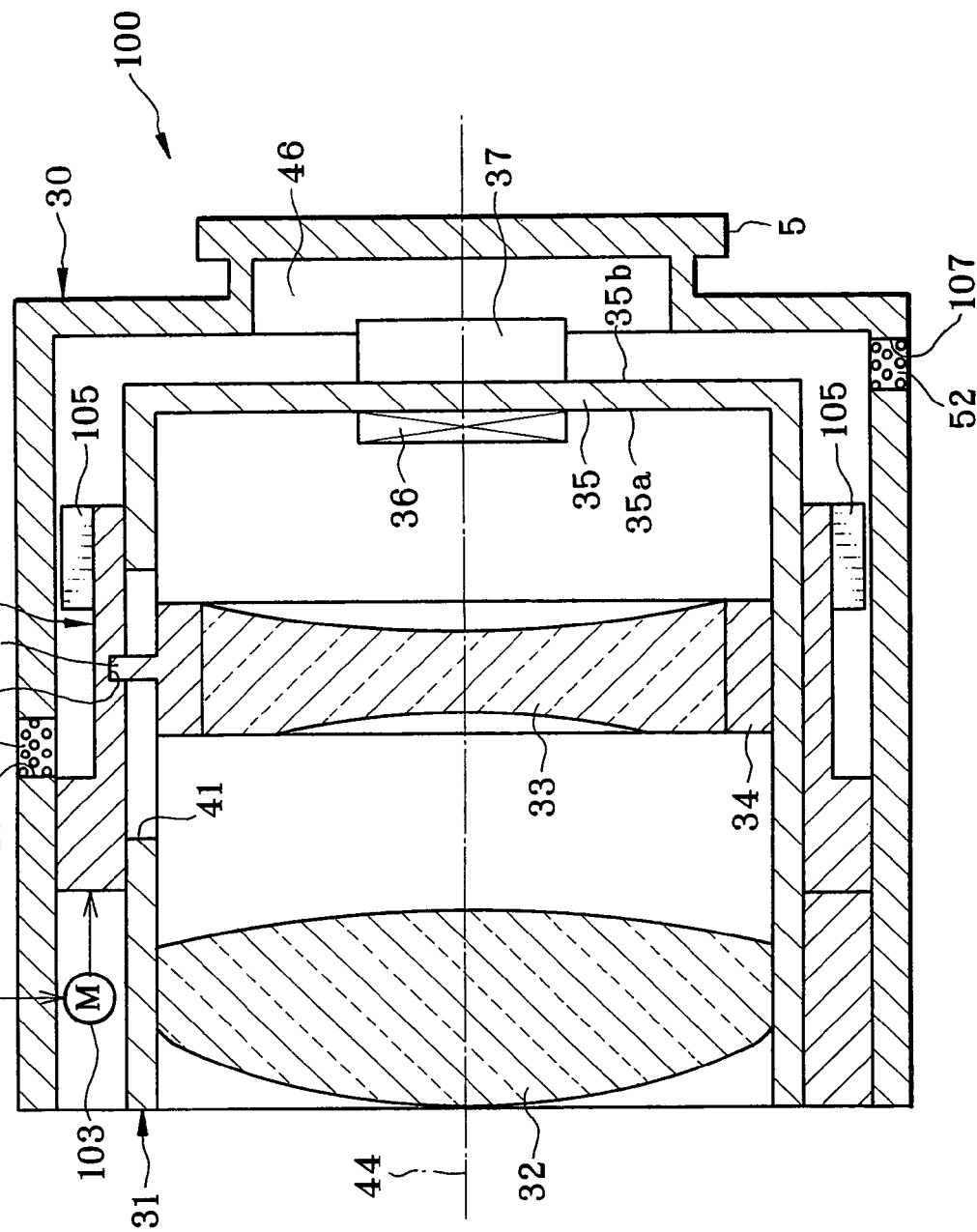
FIG. 8 is a cross section illustrating one preferred lens assembly, in which fan blades protrude in an outward direction.

In FIG. 8, a lens assembly 100 includes a cam barrel 101 as rotatable sleeve in place of the cam barrel 42 of the above embodiment. A cam surface of cam grooves 102 as moving mechanism is formed on the cam barrel 101 in the same shape as the cam grooves 43. An end of each of the cam pins 40 contacts the cam grooves 102. When the cam barrel 101 rotates about the optical axis 44, the second lens/lens group 33 moves back and forth along the optical axis 44. A motor 103 is disposed in the lens assembly 100, and causes the cam barrel 101 to rotate. A zoom button panel 104 of the camera main unit 3 of FIG. 1 is operable to drive the motor 103 for rotation.

A plurality of fan blades 105 are formed to project from the peripheral surface of the cam barrel 101, and are inclined with a generating line of the peripheral surface of the cam barrel 101, the generating line being parallel to the optical axis direction. An first vent 106 for intake of air is positioned forwards from the fan blades 105. A second vent 107 for exhaust of air is positioned backwards from the fan blades 105. When the zoom button panel 104 is operated, the cam barrel 101 rotates, to create an air flow in the inner space 46 with the fan blades 105. Thus effects similar to those of the lens assembly 4 of the first embodiment can be obtained.

In the above embodiments, air is circulated for heat dissipation. However, coolant of liquid may be used. Another preferred embodiment with this is described, in which elements similar to those of the above embodiments are designated with identical reference numerals.

Figure 9:
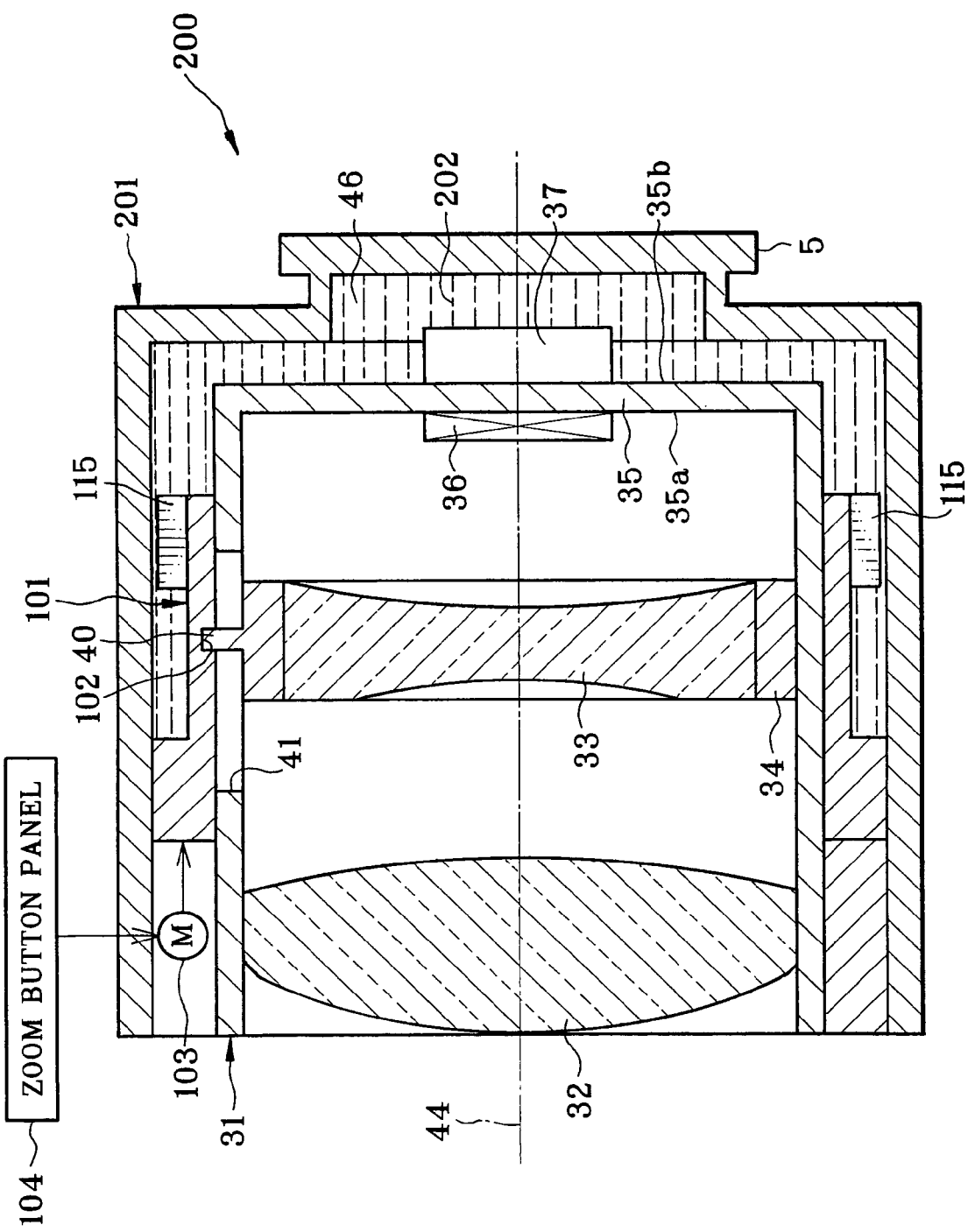
FIG. 9 is a partially broken illustrating another preferred lens assembly in which coolant is used for heat dissipation.

A lens assembly 200 of the embodiment of FIG. 9 has a stationary barrel 201 as first barrel in which no vent is formed. The inner space 46 is defined in an air tight manner by surfaces of the lens assembly 200, the inner barrel 31 and the cam barrel 101. Liquid coolant 202 is filled in the inner space 46.

When heat is generated in the CCD 36 and other relevant circuits after repeated image pickup, the heat is transmitted to the coolant 202 of the inner space 46 by the rear panel 35 and the heat dissipating fins 37. The cam barrel 101 rotates upon operation of the zoom button panel 104. Stirring blades 115 stir the coolant 202 of the inner space 46. Heat of the coolant 202 disperses and is transmitted to the stationary barrel 201 efficiently, to dissipate heat from the stationary barrel 201 to the outside.

In the above embodiments, the two vents are formed. However, three or more vents can be formed. In the first embodiment, the CCD 36 is attached to the rear panel in a solid shape. However, only edge portions of the CCD 36 may be attached to the rear panel. A middle of the rear surface of the CCD 36 may be free from the rear panel and may appear inside the inner space 46.

In the embodiments, heat dissipation is carried out at the time of zooming by rotating the rotatable sleeve. However, it is possible to dissipate heat from the lens assembly by operation of zooming in any mode other than the photographing mode, for example, playback mode.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens assembly having an image pickup device incorporated therein, comprising:
    a zoom lens for passage of light to said image pickup device;
    a rotatable mechanism for moving said zoom lens along an optical axis;
    an intake vent for flow of air from an outside to an inner space;
    an exhaust vent for flow of air from said inner space to said outside;
    plural fan blades, formed to project from said rotatable mechanism, for dissipating heat of said image pickup device by air flow of said air from said intake vent to said exhaust vent upon said rotation of said rotatable mechanism,
    wherein said air flow of said air is caused by said rotation of said rotatable mechanism.

2. A lens assembly as defined in claim 1, further comprising a first barrel for containing said zoom lens and said image pickup device, said first barrel having said intake vent and said exhaust vent, and supporting said rotatable mechanism in a rotatable manner.

3. A lens assembly as defined in claim 2, wherein said fan blades are inclined relative to a rotational direction of said rotatable mechanism.

4. A lens assembly as defined in claim 3, further comprising an air filter secured to each of said intake vent and said exhaust vent.

5. A lens assembly as defined in claim 4, wherein said rotatable mechanism is constituted by a zoom ring disposed about said inner space, said fan blades are formed to project from an inner surface of said zoom ring.

6. A lens assembly as defined in claim 5, further comprising:
    a second barrel, having said zoom lens mounted therein, and having a rear panel where said image pickup device is secured;
    a cam barrel, disposed between said first and second barrels, for moving said zoom lens along said optical axis upon rotating together with said zoom ring;
    there being a path between said first and second barrels for said air flow.

7. A lens assembly as defined in claim 2, further comprising a second barrel, having said zoom lens mounted therein, and having a rear panel where said image pickup device is secured;
    wherein said rotatable mechanism is constituted by a cam barrel, disposed between said first and second barrels, for zooming of said zoom lens;
    said fan blades are disposed outside said cam barrel, there being a path between said first and second barrels for said air flow.

8. A lens assembly as defined in claim 2, further comprising a heat dissipating fin disposed in said inner space at a rear surface of said image pickup device.

9. A lens assembly as defined in claim 2, wherein said intake vent and said exhaust vent are positioned opposite to one another with reference to said optical axis.

10. A lens assembly having an image pickup device incorporated therein, comprising:
    a zoom lens for passage of light to said image pickup device;
    a first barrel in a cylindrical shape with a rear panel;
    a second barrel in a cylindrical shape with a rear panel, disposed in said first barrel, for containing said zoom lens, said rear panel having a front surface where said image pickup device is supported;

a rotatable mechanism, disposed between said first and second barrels, for zooming operation by rotating about an optical axis;

an inner space defined between said first and second barrels and said rotatable mechanism in a fluid tight manner to include a region behind said image pickup device;

coolant of liquid stored in said inner space; and plural stirring blades, formed to project from said rotatable mechanism, for dissipating heat of said image pickup device by coolant flow of said coolant upon said rotation of said rotatable mechanism, wherein said coolant flow of said coolant is caused by said rotation of said rotatable mechanism.

11. A lens assembly as defined in claim 10, wherein said stirring blades are inclined relative to a rotational direction of said rotatable mechanism.

12. A lens assembly as defined in claim 11, wherein said rotatable mechanism is constituted by a cam barrel for moving said zoom lens along said optical axis.

13. A lens assembly as defined in claim 10, further comprising a heat dissipating fin, disposed in said inner space, to project from a rear surface of said image pickup device.

14. A lens assembly as defined in claim 1, wherein no separate cooling fan is provided.

15. A lens assembly as defined in claim 10, wherein no separate cooling fan is provided.

16. A lens assembly as defined in claim 7, wherein said fan blades are disposed on an outside surface of said cam barrel.

17. A lens assembly as defined in claim 12, wherein said stirring blades are disposed on an outside surface of said cam barrel.

* * * * *